United States Patent [19]

Jeong et al.

[11] Patent Number: 5,774,665

[45] Date of Patent: Jun. 30, 1998

[54] ASYNCHRONOUS TRANSFER MODE LAN SWITCHING HUB DEVICE USING IEEE P1355 STANDARD AND ITS CONTROL METHOD

[75] Inventors: Seong-Ho Jeong; Jang-Kyung Kim, both of Yusong-ku; Il-Young Chong, Seo-ku, all of Rep. of Korea

[73] Assignee: Electronics and Telecommunications Research Institute, Daejeon, Rep. of Korea

[21] Appl. No.: 696,091

[22] Filed: Aug. 13, 1996

[30] Foreign Application Priority Data

Dec. 7, 1995 [KR] Rep. of Korea ................ 95-47428

[51] Int. Cl.[6] ........................................................ G06F 3/00
[52] U.S. Cl. ............................ 395/200.48; 395/200.49; 395/200.6; 395/200.61; 395/200.8; 395/200.81; 370/395; 370/464; 364/DIG. 1
[58] Field of Search ......................... 395/200.48, 200.49, 395/200.6, 200.61, 200.8, 200.81; 370/395, 464; 364/DIG. 1

[56] References Cited

U.S. PATENT DOCUMENTS

| 5,408,496 | 4/1995 | Opher et al. | 370/60.1 |
| 5,586,111 | 12/1996 | Wise | 370/241 |
| 5,649,100 | 7/1997 | Ertel et al. | 395/200.1 |

*Primary Examiner*—Daniel H. Pan
*Assistant Examiner*—Dzung C. Nguyen
*Attorney, Agent, or Firm*—Antonelli, Terry, Stout & Kraus, LLP

[57] ABSTRACT

An asynchronous transfer mode LAN switching hub device using IEEE P1355 system and its control method. The invention comprises: a central processing unit module for controlling and generalizing the switching hub entire system; a switching matrix module for executing a high speed switching function of IEEE P1355 packet a; ATM-to-P1355 converting module for converting ATM cells received from ATM communication network or ATM terminal and transmitting to said switching matrix module; an MA-to-P1355 converting module for converting ethernet, token ring, FDDI packet to IEEE P1355 packet and transmitting to said switching matrix module; a communication managing module for managing the communication network; MPEG-to-P1355 converting module for transmitting MPEG video; ISDN-to-P1355 converting module for associating with narrow band width ISDN; additional application interface module; and DS (Data/Strobe) link being a high speed serial link interconnecting each module, and there is effect having an adaptability and expandability that a high speed data transmitting and receiving among the modules is possible by low cost, and even when equipping a necessary application module in future, an interconnection with existing modules is easy by merely utilizing DS link.

5 Claims, 6 Drawing Sheets

ASYNCHRONOUS TRANSFER MODE LAN SWITCHING HUB DEVICE USING IEEE P1355 STANDARD AND ITS CONTROL METHOD

BACKGROUND OF THE INVENTION

1. Field of the Invention

The present invention relates to an asynchronous transfer mode switching hub field, and more particularly, to an asynchronous transfer mode LAN switching hub device using IEEE P1355 standard and its control method.

2. Description of the Prior Art

As a recent matter, a switching hub (Hub: a device capable of sending out a signal by dispersing the signal to various other lines), multiple protocol router, and LAN access switch have attracted much attention since they are relatively cheap in cost and haves various uses other than backbone asynchronous transfer mode switching system.

Particularly, the switching hub is not only excellent in performance relative to cost but should also be so designed and manufactured so that a connection is readily possible to various backbone switches.

At the same time, in order to provide ultra-high-speed information communication network service in a LAN environment, a next generation high performance switching hub utilizing a new concept and technique is required.

For this purpose, an interconnecting system mutually connecting each module within a switching hub should be excellent.

It can be said that a precise selection of this type of interconnecting system determines the success of switching hub development.

Since a conventional technique interconnects each module through an existing VME bus or a defined back-plane, there exists limitations for connecting module numbers within the switching hub due to bus transmission speed limitations and acceptable capacity limitations, and therefore there has been a limitation for adaptability and expandability capable of accepting new applicable module.

Further, there has been a problem of producing a lowered result even in performance relative to the cost.

SUMMARY OF THE INVENTION

Therefore, in order to solve the above described problem, it is an object of the present invention to provide a switching hub device having adaptability and expendability which uses a HIC (Heterogeneous InterConnecting) system having a IEEE P1355 standard, interconnects each applying module of a switching hub by using a high speed serial link as DS (Data/Strobe) link, whereby high speed data transmitting and receiving among the modules is possible at a cheap cost, and an interconnection with existing modules is easy by merely utilizing merely DS link upon equipping an application module required hereafter.

In order to achieve the above described object, an asynchronous transfer mode LAN switching hub device in accordance with the present invention comprises: a central processing unit module for controlling and generalizing the entire switching hub system; a switching matrix module for executing a high speed switching function of the IEEE P1355 packet; ATM-to-P1355 converting module for converting ATM cells received from an ATM communication network or an ATM terminal and transmitting to said switching matrix module; MA-to-P1355 converting module for converting ethernet, token ring, FDDI packet to an IEEE P1355 packet and transmitting to said switching matrix module; a communication managing module for managing the communication network; MPEG-to-P1355 converting module for transmitting MPEG video; ISDN-to-P1355 converting module for associating with narrow band ISDN; additional application interface module; and DS (Data/Strobe) link providing a high speed serial link interconnecting each module.

An operating method of the switching hub device of the present invention comprises: a first step for initiating P1355 protocol operation of each module contained within the switching hub when power of switching hub is turned ON; a second step for checking for generation of switching demand matter from an application module within the switching hub and then, when a switch demand intending to transmit to other module has occurred, converting a high order application program within each application module generated with demanding matter to an IEEE P1355 packet for transmitting in high speed to the switching matrix module through data/strobe (DS) link; a third step for executing a high speed switching function for transmitting an IEEE P1355 packet received from data/strobe link by the switching matrix module to a destination address application module; a fourth step for checking for generation of transmission demanding matter within the application module and then when the demanding matter is continuously generated, repeatedly executing the steps described above, and when a demanding matter is not generated, proceeding to into a standby state; and a fifth step for turning the power OFF when use of the switching hub is no longer required and terminating the switching hub function execution.

DETAILED DESCRIPTION OF PREFERRED EMBODIMENTS

Hereinafter, a preferred embodiment of the present invention will be described more in detail with reference to the accompanying drawings.

Figure 1:
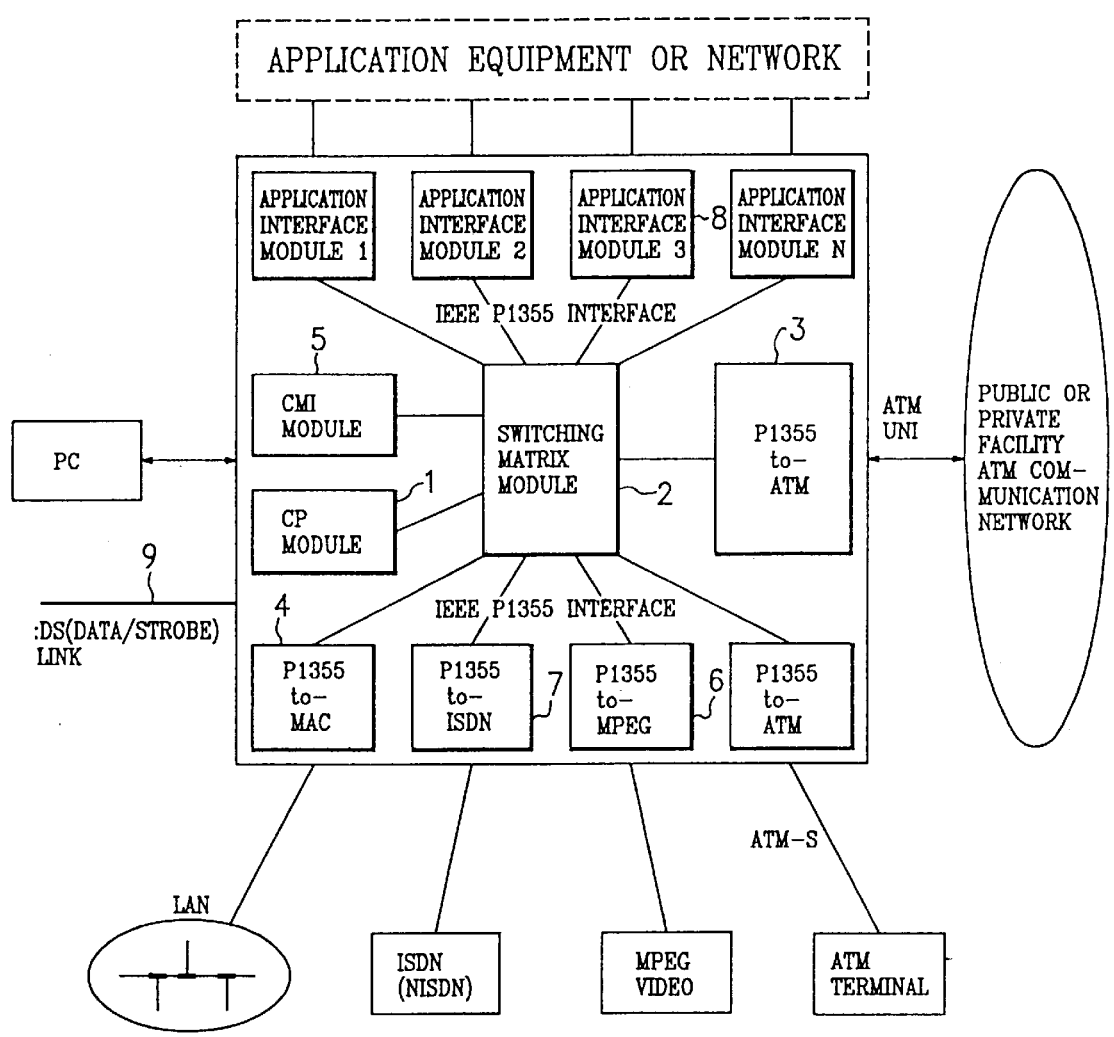
FIG. 1 is an entire block diagram of hardware in accordance with the present invention.

An asynchronous transfer mode LAN switching hub device of the present invention, as shown in FIG. 1, comprises: as shown a central processing module 1 for controlling and generalizing an entire switching hub entire system; a switching matrix module 2 for executing a high speed switching function of an IEEE P1355 packet; ATM-to-P1355 converting module 3 for converting ATM cells received from an ATM communication network or ATM terminal and transmitting the converted cells to said switching matrix module 2; MA-to-P1355 converting module 4 for converting an ethernet, token ring, FDDI (Fiber Distributed Data Interface) packet to an IEEE P1355 packet and transmitting to said switching matrix module 2; a communication managing module 5 for managing the communication network; MPEG-to-P1355 converting module 6 for transmitting MPEG video; ISDN-to-P1355 converting module 7 for associating with narrow band width ISDN (Integrated Services Digital Network); additional application interface module 8; and DS (Data/Strobe) link 9 being providing a high speed serial link interconnecting each module.

Figure 2:
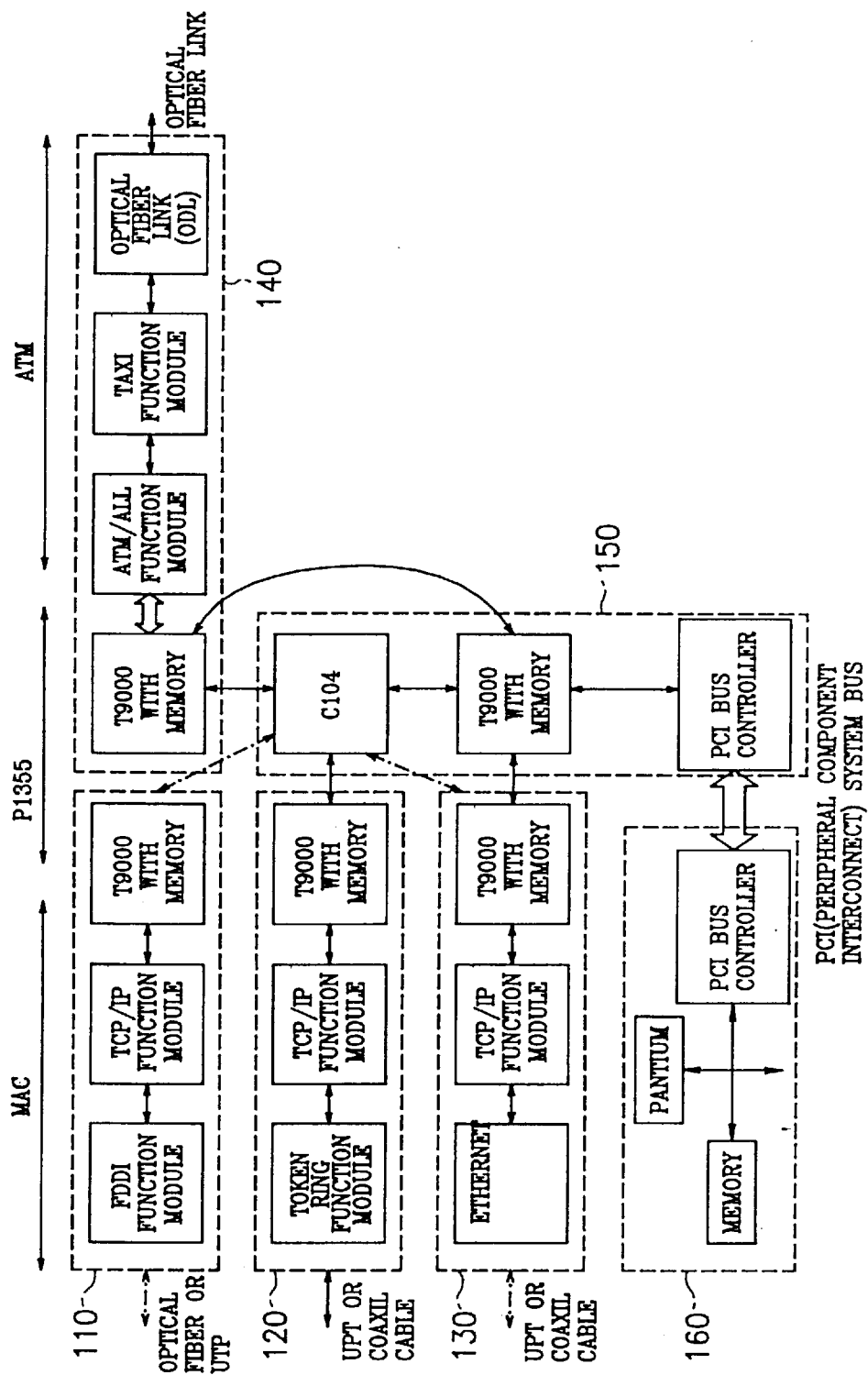
FIG. 2 is a detailed construction diagram of hardware of FIG. 1.

FIG. 2 shows an embodiment of the present invention, and the switching hub offered as an embodiment has three kinds of interfaces.

That is, the switching hub comprises: MAC (Medium Access Control) interface connecting an FDDI, token ring, and ethernet, P1355 interface executing P1355 functions, and ATM interface executing pure ATM and AAL functions.

Reviewing each module of the switching module in detail, the MAC (Medium Access Control) interface 100 comprises: FDDI-to-P1355 converting module 110 for converting a packet received from FDDI to P1355 packet; a converting module 120 for converting a packet received from the token ring network; Ethernet-to-P1355 converting module 130 for converting a packet received from ethernet to a P1355 packet; ATM-to-P1355 converting module 140 for converting ATM cells received from ATM network to a P1355 packet; a switching matrix module 150 for executing a P1355 packet switching function; and central processing module 160 for controlling the switching hub entirety.

Figure 3:
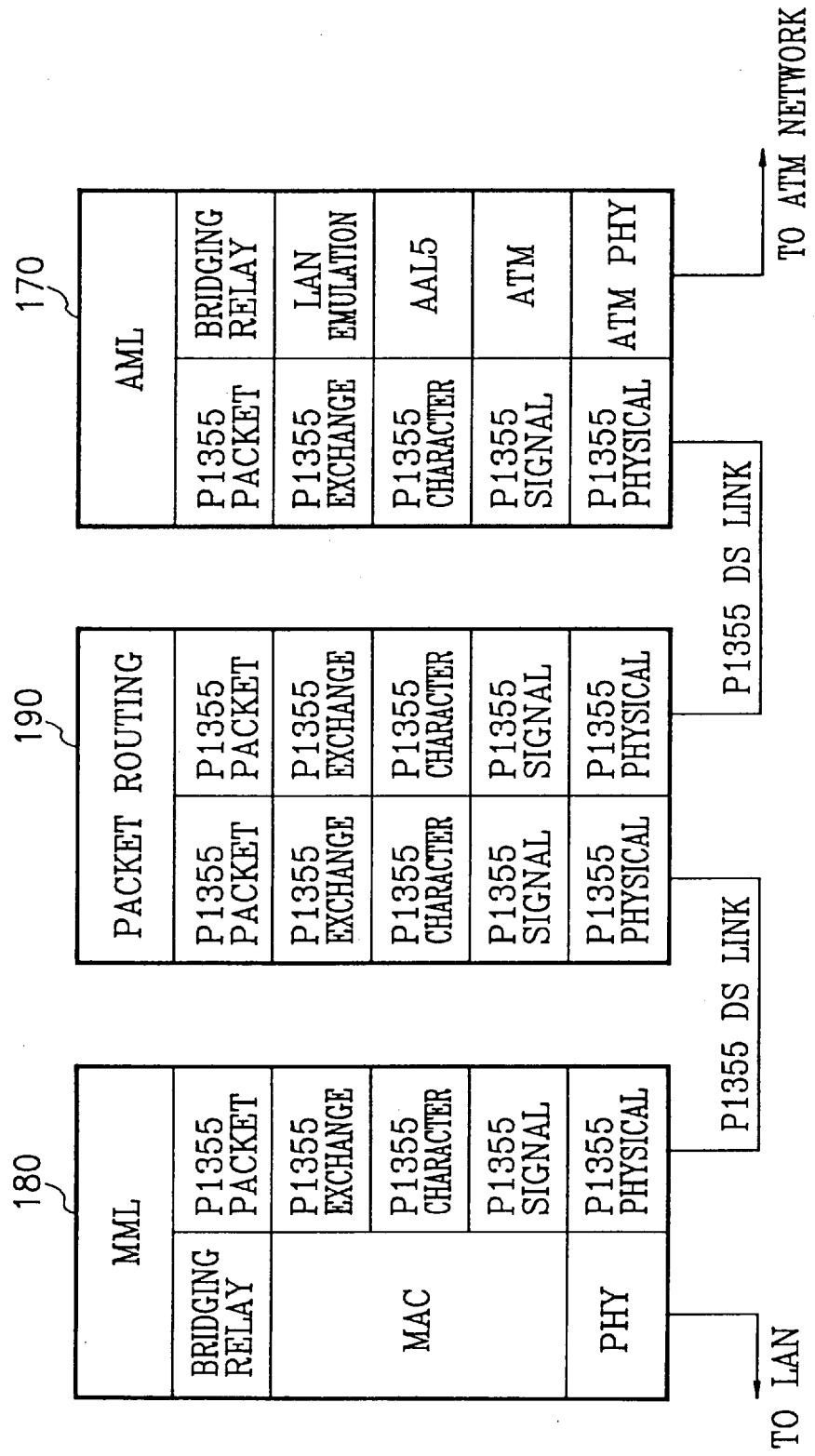
FIG. 3 is a view of protocol to be loaded to the switching hub.

FIG. 3 shows protocol construction loaded to the switching hub offered as an embodiment of the present invention, and particularly shows protocol construction loaded on ATM-to-P1355 module 170, MAC-to-P1355 module 180, and P1355 switching matrix module 190.

The protocol loaded to MAC-to-P1355 module 180 comprises: PHY layer having a physical layer for directly connecting at an existing LAN, an MAC layer for executing a media accessing control function of the LAN protocol, bridging/relay layer for executing a bridging and relay function, MML (MAC Mapping Layer) for converting MAC packet to P1355 packet, and a P1355 protocol layer. The protocol layer loaded to P1355 switching matrix module 190 includes: a packet layer, an exchange a layer, character a layer, signal layer, and a physical layer, in response to a PDU (Protocol Data Unit).

The ATM-to-P1355 converting module 170 includes: PHY layer having an ATM physical layer for directly connecting with an ATM network, an ATM layer for executing ATM protocol, an AAL (ATM Adaptation Layer) type 5 layer for executing an ATM adaptable function type 5, a LAN emulation layer for executing LAN emulation function, a bridging/relay layer for executing a bridging and relay function, an ATM-to-P1355 converting module and a P1355 packet layer for converting ATM cell to P1355 packet, P1355 exchange layer, P1355 character layer, P1355 signal layer, and P1355 physical layer.

The P1355 switching matrix module 190 includes P1355 packet layer, P1355 exchange layer, P1355 character layer, P1355 signal layer, P1355 physical layer, and a packet routing layer for executing a path setting of the packet.

Figure 4:
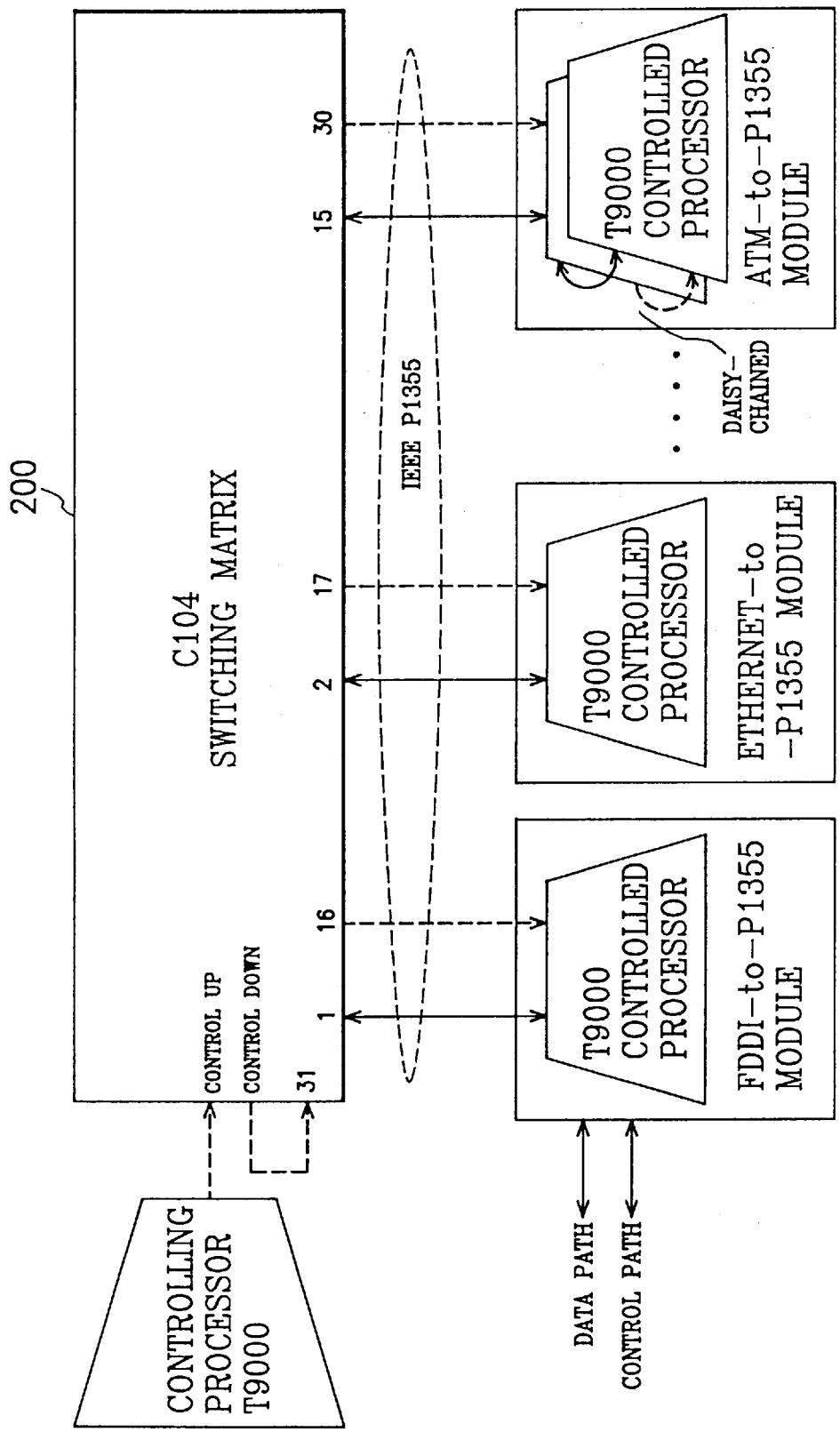
FIG. 4 is a control and data link connecting diagram passing through the switching matrix module.

FIG. 4 shows a connecting diagram of a control and data link passing through the switching matrix module 200.

In order to control each module, by utilizing a control up-link of the switching matrix module, a rapid control action is made through the data/strobe (DS) link of each module in which a control command of T9000 intends to control through the switching matrix. Data transmission between the modules can readily execute a data exchange among each modules at a high speed by utilizing C104 of the switching matrix through data transmission path.

FIG. 5 is a chart for illustrating MAC-to-P1355 packet conversion and ATM-to-p1355 packet conversion at the switching hub.

Figure 5A:
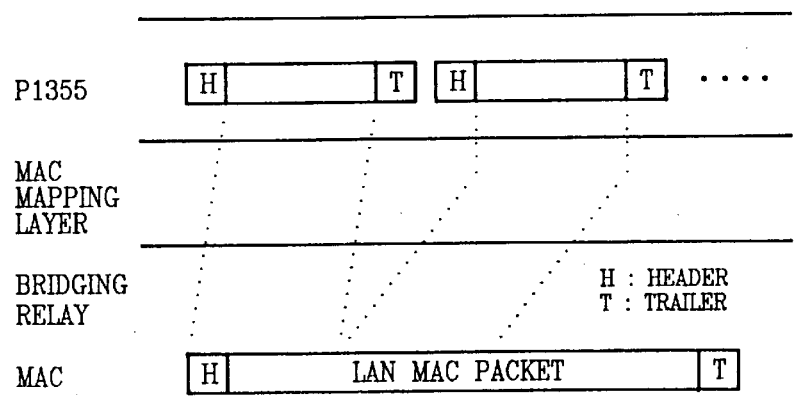
FIG. 5 is varying chart of packet form within the switching hub.

As shown in FIG. 5(A), the MAC packet is converted to many P1355 packets through the MML and bridging/relay layer.

Figure 5B:
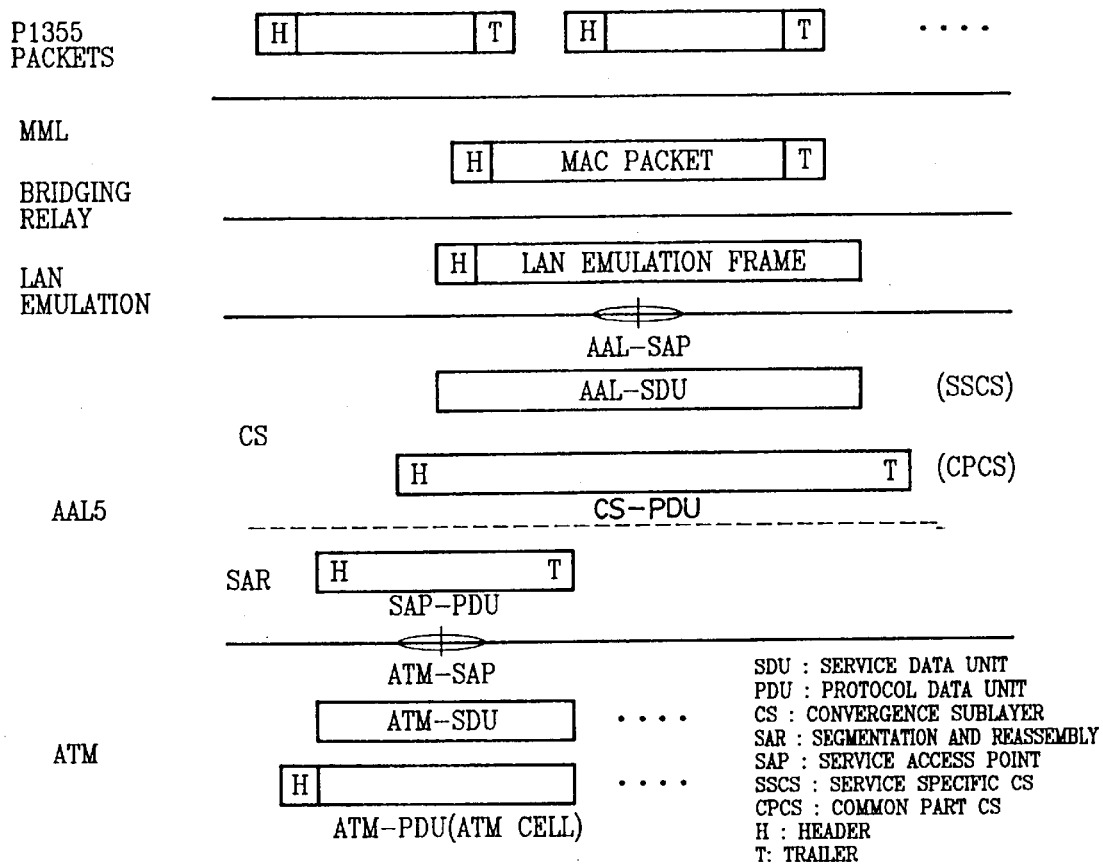

A process in which an ATM cell is converted to a P1355 packet is shown in FIG. 5(B), and the ATM cell received from an ATM network is converted to AAL SDU (Service Data Unit) at an AAL layer and passed through a LAN emulation layer and the bridging/relay layer and is then divided to P1355 packet whereby transmitted to the switching matrix module.

Figure 6:
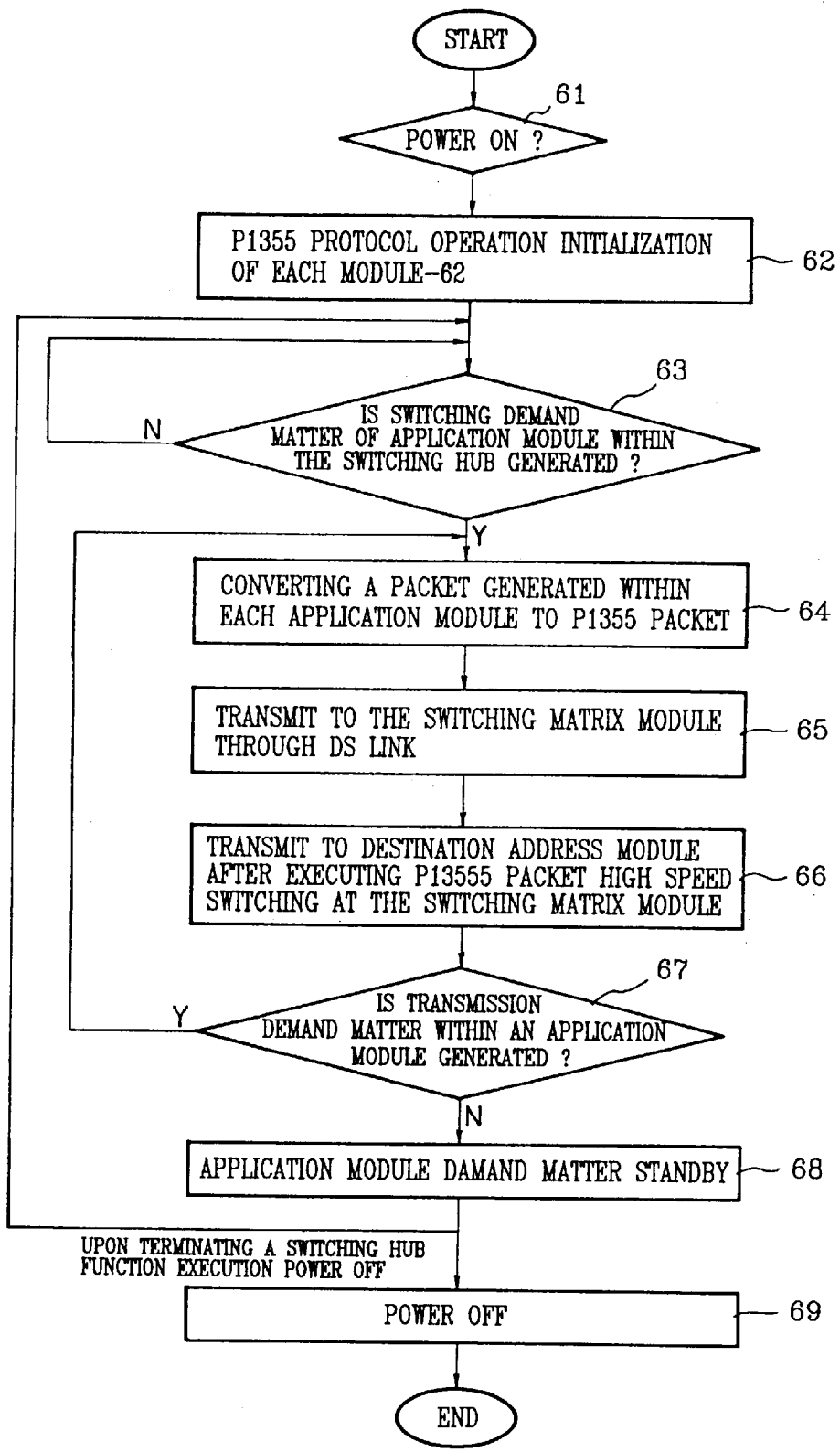
FIG. 6 is an operational flow chart of the LAN switching hub in accordance with the present invention.

FIG. 6 is a flow chart illustrating an operation of the switching hub.

In FIG. 6, when a power of the switching hub is turned ON at step 61 the P1355 protocol operation of each module contained within the switching hub is initialized at step 62. Then it is checked whether or not a switching demand matter is generated from an application module within the switching hub at step 63, and when a demand matter intended to transmitting to other modules is generated, a high order application program in each application module generated with a demand matter or a packet received from network is converted to a P1355 packet at step 64, thus being transmitted at high speed to the switching matrix module through the data/strobe DS link at step 65.

At the switching matrix module, a high speed switching function is executed for transmitting the P1355 packet received from DS link to a destination address application module at step 66.

Thereafter, it is checked whether or not a transmission demand matter within the application module is generated at step 67 and then when a demand matter is continuously generated, steps 64 to step 66 are repeatedly executed, and when a demand matter has not occurred, to the process proceeds a standby state at step 68.

When no more use of the switching hub is required, the power is turned OFF at step 69 and the switching hub function execution is terminated.

In accordance with the present invention as described above, high speed data transmitting and receiving is possible at a low cost by interconnecting each other by using a high speed serial link providing as each application module data/strobe DS of the switching hub by using an HIC (Heterogeneous InterConnecting) system having an IEEE P1355 standard, and since an interconnection with an existing module is easily provided by merely utilizing a DS link even when equipping an application module being necessary in the future, adaptability and expandability of this system is possible.

What is claimed is:

1. An asynchronous transfer mode LAN switching hub device using an IEEE P1355 system, comprising:

a central processing unit module for controlling and generalizing the switching hub of an entire LAN system;

a switching matrix module for executing a high speed switching function of the IEEE P1355 packet;

an ATM-to-P1355 converting module for converting ATM cells received from an ATM communication network or an ATM terminal and transmitting the converted cells to said switching matrix module;

an MA-to-P1355 converting module for converting ethernet, token ring, FDDI packet to IEEE P1355 packet and transmitting to said switching matrix module;

a communication managing module for managing the LAN system;

an MPEG-to-P1355 converting module for transmitting MPEG video;

an ISDN-to-P1355 converting module for associating with narrow band width ISDN;

an application interface module; and

DS (Data/Strobe) link having a high speed serial link interconnecting each module.

2. An asynchronous transfer mode LAN switching hub device using IEEE P1355 system as defined in claim 1, wherein a protocol layer loaded to said switching matrix module includes: a packet layer, an exchange layer, a character layer, a signal layer, and a physical layer.

3. An asnychronous transfer mode LAN switching hub device using IEEE P1355 system as defined in claim 1, wherein a protocol layer loaded to said ATM-to-P1355 module includes: a PHY layer having an ATM physical layer for directly connecting with the ATM network, an ATM layer for executing ATM protocol, an AAL (ATM Adaptation Layer) type layer for executing an ATM adaptable function, a LAN emulation layer for executing LAN emulation function, a bridging/relay layer for executing a bridging and relay function, an ATM-to-P1355 converting module and P1355 packet layer for converting ATM cells to a P1355 packet, a P1355 exchange layer, a P1355 character layer, a P1355 signal layer, and a P1355 physical layer.

4. An asynchronous transfer mode LAN switching device using IEEE P1355 system as defined in claim 1, wherein said P1355 switching matrix module includes: a P1355 packet layer, a P1355 exchange layer, a P1355 character layer, a P1355 signal layer, a P1355 physical layer, and a packet routing layer for executing a path setting of the packet.

5. An asynchronous transfer mode LAN switching hub control method using IEEE P1355 system, said method comprising the steps of:

initiating P1355 protocol operation of each module contained within the switching hub when power of switching hub is turned ON;

checking whether or not switching demand matter is generated from an application module within the switching hub and then, when a demanding matter intended for transmitting to other modules has been generated, converting a high order application program within each application module generated with demanding matter to a P1355 packet, wherein the transmitting is performed at a high speed to the switching matrix module through data/strobe (DS) link;

executing a high speed switching function for transmitting the P1355 packet received from the data/strobe link by the switching matrix module to a destination address application module;

checking whether or not transmission demanding matter is generated within the application module and then when the demanding matter is continuously generated, repeatedly executing the steps provided above, and when a demanding matter is not generated, proceeding to a standby state; and turning the power OFF when use of switching hub is no longer required and terminating the switching hub function execution.

* * * * *